US008506822B2

(12) United States Patent
Moody et al.

(10) Patent No.: US 8,506,822 B2
(45) Date of Patent: *Aug. 13, 2013

(54) CONCENTRATION OF SUSPENSIONS

(75) Inventors: Gillian Moody, Brighouse (GB); Anthony Allen, Shipley (GB); Stephen Adkins, Cleckheaton (GB); Brian Dymond, Bradford (GB); Paul Stocks, Bradford (GB)

(73) Assignee: BASF SE, Ludwigshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/314,243

(22) Filed: Dec. 8, 2011

(65) Prior Publication Data

US 2012/0145644 A1 Jun. 14, 2012

Related U.S. Application Data

(63) Continuation of application No. 12/087,807, filed as application No. PCT/EP2007/050084 on Jan. 4, 2007, now Pat. No. 8,097,167.

(30) Foreign Application Priority Data

Jan. 18, 2006 (GB) .................................. 0601000.3

(51) Int. Cl.
*B03D 3/06* (2006.01)
*B01D 21/00* (2006.01)

(52) U.S. Cl.
USPC ............... 210/721; 209/5; 210/702; 210/727; 210/733; 210/734

(58) Field of Classification Search
None
See application file for complete search history.

(56) References Cited

U.S. PATENT DOCUMENTS

| 3,897,333 | A | * | 7/1975 | Field et al. ..................... 210/734 |
| 3,938,594 | A | * | 2/1976 | Rhudy et al. ................ 166/308.5 |
| 3,975,496 | A | | 8/1976 | Smalley et al. |

(Continued)

FOREIGN PATENT DOCUMENTS

| EP | 0102760 | 3/1984 |
| EP | 0126528 | 11/1984 |

(Continued)

OTHER PUBLICATIONS

English Language Abstract of Japan of JP 10-109100 (1998).

(Continued)

*Primary Examiner* — Bobby Ramdhanie
*Assistant Examiner* — Benjamin Behrendt
(74) *Attorney, Agent, or Firm* — Shruti Costales

(57) ABSTRACT

A process of concentrating an aqueous suspension of solid particles comprising the steps of adding at least one organic polymeric flocculant to the suspension thereby forming flocculated solids in which the flocculated solids are allowed form a layer of solids and thereby forming a more concentrated suspension in which the process comprises the addition of an effective amount of an agent that is selected from the group consisting of free radical agents, oxidizing agents, enzymes and radiation, in which the agent is applied to the suspension prior to or substantially simultaneously with adding the organic polymeric flocculant and/or the organic polymeric flocculant is added to the suspension in a vessel and the agent is applied to the suspension in the same vessel. The process is particularly suitable for solids liquid separation in which the flocculated solids are allowed to settle by sedimentation in a gravity thickener.

17 Claims, 1 Drawing Sheet

Effect of flocculant and $H_2O_2$ on the underflow Yield Stress

(56) References Cited

U.S. PATENT DOCUMENTS

| | | | |
|---|---|---|---|
| 4,017,392 A | 4/1977 | Hamer et al. | |
| 4,051,027 A | 9/1977 | Batzer et al. | |
| 4,069,152 A * | 1/1978 | Specken | 210/721 |
| 4,226,714 A | 10/1980 | Furness et al. | |
| 4,506,062 A | 3/1985 | Flesher et al. | |
| 4,528,321 A | 7/1985 | Allen et al. | |
| 4,555,346 A * | 11/1985 | Rosen et al. | 210/734 |
| 4,599,379 A | 7/1986 | Flesher et al. | |
| 4,673,704 A | 6/1987 | Flesher et al. | |
| 5,520,820 A | 5/1996 | Moody et al. | |
| 5,685,900 A | 11/1997 | Yuan et al. | |
| 6,001,920 A | 12/1999 | Ghafoor et al. | |
| 6,031,037 A | 2/2000 | Ghafoor et al. | |
| 6,365,116 B1 | 4/2002 | Barham et al. | |
| 6,447,687 B1 | 9/2002 | Winn et al. | |
| 6,723,246 B2 * | 4/2004 | Krulik | 210/636 |
| 6,733,674 B2 | 5/2004 | Sarkar et al. | |
| 6,932,909 B2 | 8/2005 | Rey | |
| 7,122,080 B2 | 10/2006 | Pruett et al. | |
| 7,252,783 B2 | 8/2007 | Weir et al. | |
| 7,264,734 B2 * | 9/2007 | Kelly et al. | 210/710 |
| 8,097,167 B2 * | 1/2012 | Moody et al. | 210/721 |
| 2003/0121863 A1 | 7/2003 | Kelly et al. | |
| 2003/0141256 A1 | 7/2003 | Sarkar et al. | |
| 2005/0258095 A1 | 11/2005 | Sarkar et al. | |
| 2006/0131243 A1 | 6/2006 | Garska et al. | |
| 2008/0190860 A1 | 8/2008 | Franks et al. | |

FOREIGN PATENT DOCUMENTS

| | | |
|---|---|---|
| EP | 0150933 | 8/1985 |
| EP | 0170394 | 2/1986 |
| JP | 56-150481 | 11/1981 |
| JP | 1-146541 | 6/1989 |
| JP | 10-109100 | 4/1998 |
| JP | 11-156397 | 6/1999 |
| JP | 2001-232104 | 8/2001 |
| WO | 9314852 | 8/1993 |
| WO | 9831748 | 7/1998 |
| WO | 9831749 | 7/1998 |
| WO | 0216495 | 2/2002 |
| WO | 02083258 | 10/2002 |
| WO | 2004071989 | 8/2004 |
| WO | 2005021129 | 3/2005 |
| WO | 2005073132 | 8/2005 |

OTHER PUBLICATIONS

V. Bertini et al., Particulate Science and Technology vol. 9 (1991) pp. 191-199.

English Language Abstract of JP 56-150481 (1981).

English Language Abstract of JP 11-156397 (1999).

English Language Abstract of JP 2001-232104 (2001).

English language abstract of JP 1-146541 (1989).

* cited by examiner

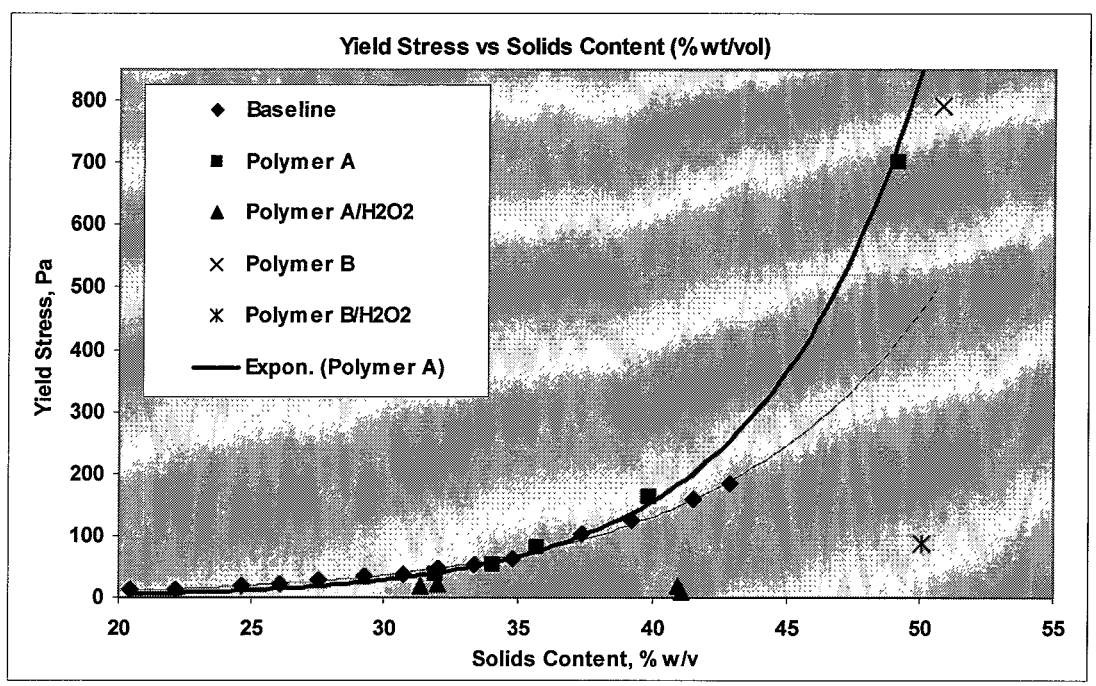
Effect of flocculant and $H_2O_2$ on the underflow Yield Stress

CONCENTRATION OF SUSPENSIONS

This application is a continuation application of Ser. No. 12/087,807, filed on Jul. 15, 2008, now U.S. Pat. No. 8,097,167, which is a National Stage Entry of PCT/EP2007/050084 filed Jan. 4, 2007.

BACKGROUND

The present invention relates to an improved flocculation process for the concentration of suspensions. In particular flocculated solids can be settled to form a bed in which higher solids and/or reduced yield stress can be achieved.

It is known to concentrate suspensions of solids in aqueous liquids by use of flocculants resulting in flocculation of the solids which facilitates the separation of the solids from the liquid. In many processes the flocculated solids settle to form a bed by sedimentation. In other processes separation can be facilitated by mechanical dewatering, for instance in pressure filtration, centrifugation, by belt thickeners and belt presses.

The types of flocculant added to the suspension will often depend upon the substrate. Generally suspensions tend to be flocculated by high molecular weight polymers. Examples of this are described in WO-A-9314852 and U.S. Pat. No. 3,975,496 regarding the flocculation of mineral suspensions such as red mud. Other disclosures of high molecular weight polymeric flocculants include U.S. Pat. No. 6,447,687, WO-A-0216495 and WO-A-02083258 dealing with the flocculation of sewage sludge. It is known to sometimes add other chemical additives to condition the suspension. For instance suspensions may be first coagulated by a high charged density polymeric coagulant such as polyDADMAC or inorganic coagulants including ferric chloride.

Other additives are also use in conditioning of suspensions. For example peroxides are sometimes added to suspensions such as sewage sludges or other suspensions containing organic material in order to remove reducing agents in order to reduced odours, gas formation or prevent putrefaction. In general the peroxides or oxidising agents tend to be added in order to remove harmful or unwanted substances or other materials contained in the suspension. Generally the amount of peroxides added is only sufficient to remove the unwanted substances and materials and generally peroxides or other oxidising agents are included in relatively small amounts.

Examples of adding peroxides to sewage sludge are described in JP56150481. Peroxides or oxidising agents may also be added to other suspensions for similar reasons including treating dredged material to remove contaminants as described in US 2003 121863 and JP 10109100. JP 11156397 describes a process for flocculating mud using non-ionic and anionic polymers in which the mud has been pretreated with an oxidising agent.

U.S. 6733674 describes a method of dewatering sludge by adding an effective amount of one or more cellulolytic enzymes and one or more oxidants and one or more flocculants to form a mixture in water which is coagulated and flocculated followed by separation of solids from the water. The examples seem to indicate a significant time elapsed between oxidant addition and flocculation. The enzymes appeared to be present in order to degrade material contained in the sludge.

Suspensions are frequently concentrated in a gravity thickener vessel. A continual flow of the suspension is typically fed into the thickener and treated with a flocculant. The flocculated solids thus formed settle to form a bed of solid underflow and supernatant aqueous liquid flows upwards and is usually removed from the thickener vessel through a perimeter trough at the water surface. Normally the thickener vessel has a conical base such that the underflow can easily be removed from the centre of the base. In addition a rotating rake assists the removal of the underflow solids. A typical process for concentrating suspensions in a gravity thickener is described in U.S. Pat. No. 4,226,714. Various suspensions can be concentrated in gravity thickeners, including suspensions of organic solids such as wastewater, sewage and sewage sludges. If it also commonplace to thicken or dewater mineral suspensions using gravity thickeners.

In a typical mineral processing operation, waste solids are separated from solids that contains mineral values in an aqueous process. The aqueous suspension of waste solids often contain clays and other minerals, and are usually referred to as tailings. These solids are often concentrated by a flocculation process in a thickener and settle to form a bed. Generally it is desirable to remove as much water from the solids or bed in order to give a higher density underflow and to recover a maximum of the process water. It is usual to pump the underflow to a surface holding area, often referred to as a tailings pit or dam, or alternatively the underflow may be mechanically dewatered further by, for example, vacuum filtration, pressure filtration or centrifugation.

U.S. Pat. No. 5,685,900 describes a selective flocculation process for beneficiating a low brightness fine particle size kaolin in order to reduce a higher brightness kaolin clay. The process involves a classification step to recover the kaolin fraction wherein the particles are at least 90% by weight below 0.5 µm. The recovered fraction is then subjected to a bleaching step to partially bleach organic discolorants. The resulting slurry is selectively flocculated using a high molecular weight anionic polyacrylamide or acrylate acrylamide copolymer. This flocculation step forms a supernatant phase which is highly concentrated with contaminant titania and a flocced clay phase which is devoid of titania that contains the discolorants. The flocs are then treated with gaseous ozone in order to oxidising the remaining discolouring organics and also destroy the flocculant polymer in order to restore the kaolin to a dispersed state. This is said to be achieved by passing the flocculated solids through an ozonation step, preferably using a high shear pump.

Similar disclosures are made in WO 2004 071 989 and US 2006 0131243.

WO 2005 021129 discloses controlling the condition of a suspension of solid particles within a liquid including applying 1 or more stimuli to the suspension. In this disclosure conditioning is preferably reversible and involves flocculation and/or coagulation in which inter particle forces may be attractive or repulsive between the solid particles within the liquid. The stimulus may be one or more chemical additives and may for instance be a stimulus sensitive polyelectrolyte which can be absorbed on the surface of the suspended particles in sufficient quantity to create steric or electrostatic repulsion between the particles. In one instance a polyelectrolyte may be substantially insoluble at pH values where it is substantially uncharged thereby to effect flocculation of the suspension. Polyelectrolytes that are responsive to a temperature stimulus are also described. Reference is also given to a method of controlling the consolidation of a bed of solid particles within a liquid by applying one or more stimuli to the bed. Each or the stimulus effects reversibly operable conditioning between an initial state prevailing prior to said applying one or more stimuli and a conditioning state resultant from said one or more stimuli. The processes described bring about improvements in certain solids liquids separation activities.

JP 11-46541 describes a temperature sensitive hydrophilic polymer added to a suspension of particles below a transition temperature whereupon flocs are formed by absorbing and cross-linking particles as a conventional flocculant. The mixture is heated to above the transition temperature and the absorbed polymer becomes hydrophobic and the suspended particles are rendered hydrophobic and form flocs by hydrophobic interaction. Appropriate external pressure is applied at this time and the particles are readily realigned and water between the particles is expelled by the hydrophobicity of the particles. JP 2001 232104 describes a process similar to JP 11-46541 but using improved temperature sensitive flocculants that are ionic temperature sensitive polymer as opposed to non-ionic polymers which absorb onto suspended particles and when the polymer becomes hydrophobic at temperatures about the transition point there are strong hydrate layers around the ionic groups but hydrated layer adhesion between the polymers is prevented by hydrophobic interaction.

Bertini, V. et. al. Particulate Science and Technology (1991), 9(3-4), 191-9 describes the use of multifunctional polymers for the pH controlled flocculation of titanium minerals. The polymers are radical vinyl copolymers containing catechol functions and acrylic acid units. The polymers can change their effect from flocculating to dispersing or inert and vice versa by changing pH.

The pH or temperature sensitive flocculants in principle provide control over the flocculation state of a suspension. However, the choice of flocculant would need to be appropriate for the particular suspension or bed that is to be flocculated and at the same time be responsive to a particular stimulus to bring about the reversibly operable conditioning. In some cases it may be difficult to find the right choice of flocculant.

Frequently some water will be trapped in the flocculated solids and this water is often difficult to release and therefore held in the bed. Whilst pH and temperature responsive flocculants may assist with this problem it is often difficult to achieve satisfactory flocculation across a wide range of substrates.

In processes involving gravity thickeners it is desirable to operate such that the bed has the highest possible solids capable of being removed from the thickener as an underflow. Normally the limiting factor is the ability of the rake in the thickener to move the sedimented solids. It would therefore be desirable to provide a process which increases the rate of separation of the solids from the suspension and removal of the underflow.

SUMMARY

According to the present invention we provide a process of concentrating an aqueous suspension of solid particles comprising the steps of adding at least one organic polymeric flocculant to the suspension thereby forming flocculated solids in which the flocculated solids are allowed form a layer of solids and thereby forming a more concentrated suspension in which the process comprises the addition of an effective amount of an agent is selected from the group consisting of free radical agents, oxidising agents, enzymes and radiation, in which the agent is applied to the suspension prior to or substantially simultaneously with adding the organic polymeric flocculant and/or the organic polymeric flocculant is added to the suspension in a vessel and the agent is applied to the suspension in the same vessel.

BRIEF DESCRIPTION OF THE DRAWING

FIG. 1 is a graph of the test results from instant Example 2.

DETAILED DESCRIPTION

We have found that inclusion of the agent significantly improves the efficiency of the concentration process. By concentration we mean that the solids content of the suspension is increased. Typically concentration of a suspension will include dewatering processes and thickening processes and the like.

Preferably the flocculated solids are allowed to settle to form a bed of solids which may also be termed a sediment. More preferably the process involves sedimentation in a gravity thickener and a sediment or bed is removed from the thickener as an underflow.

Surprisingly contacting the layer or bed of solids with the agent enables a significant increase in aqueous liquid released.

Desirably the agent brings about fragmentation of the flocculated structure. Preferably, we find that the flocculated network can collapse and often occupy a small volume than the settled solids would have occupied in the absence of the agent.

In one form the agent may bring about degradation of the organic polymeric flocculant. It is believed that the chemical interaction between the flocculant and the solids is permanently altered as a result of this degradation of polymeric flocculant. The polymer may be degraded such that the solids have a reduced flocculated network. In one aspect the polymer chain may break down into smaller chains which induces a dispersant effect on the solids. In some cases the polymer may be degraded to the extent that it no longer has a flocculating effect on the solids. The degradation of the organic polymeric flocculant preferably is in conjunction with a degradation or size reduction of the flocculated structure. In a more preferred form we find that the flocculated network collapses thereby increasing the solids content for a given volume.

In one preferred form the agent brings about a reduction in the yield stress of a layer of solids formed from the action of the organic flocculant. More preferably the layer of solids should be at least 30% below the yield stress of a layer of solids at an equivalent solids content without the addition of the agent. Thus the agent desirably brings about a reduction in the yield stress of the layer or bed of solids it enables higher solids to be achieved and an increased removal of the underflow. Preferably the reduction in yield stress will be at least 50% below the yield stress of a layer of solids at an equivalent solids content without the addition of the agent. More preferably the reduction in yield stress will be at least 60 or 70% and often at the least 80 or 90%.

Unexpectedly we have also found that the stress can be reduced below the yield stress of a layer of solids at an equivalent solids content that had not been flocculated and without the addition of the agent. Until now it has been a generally accepted view that sedimentation of solids in the absence of flocculation would achieve the lowest yield stress. It was generally believed that a process involving flocculation would always result in a higher yield stress than in the absence of the flocculant because the flocculant would tend to hold the sedimented solids in a structure that would tend to increase the yield stress. Consequently it is particularly surprising that such a process involving the use of the flocculant may result in a yield stress below the yield stress than a settled suspension without the use of flocculant.

Preferably the above-mentioned reductions in yield stress will be in combination with either a degradation or fragmentation of the flocculated structure and/or alternatively in combination with a degradation of the organic polymeric flocculant. It is especially preferred that the degradation of the organic polymeric flocculant is responsible for a degradation or size reduction of the flocculated structure which in turn brings about a reduction of the yield stress of the layer or bed of solids.

In a preferred form of the process the flocculated solids settle to form a bed and water is released from the suspension and in which we have found that the exposure of the flocculated solids to the agent brings about an increase in the water released from the suspension. Consequently, we find that this increase in water released is also accompanied by an increase in the solids.

In a further aspect the agent may evolve a gas. We find that the release of gas into the layer or bed of solids can enhance the release of water. In a preferred form the flocculated solids settle to form a bed and the agent is in contact with the flocculated solids or the bed and this brings about a further release of for and an increase in the solids. Preferably, the gas is released and forms gas bubbles. Without being limited to theory it is believed that the gas may for instance cause the formation of channels or fissures in the bed of solids and facilitate the release of water from the suspension.

Agents that can evolve a gas include carbonates, bicarbonates and peroxides.

The process of the present invention has been found to enhance the concentration of a suspension, especially by gravity sedimentation. In this sense the rate of consolidation of separated solids is increased. In addition the mobility of concentrated phase, i.e. settled or sedimented solids, can be significantly improved.

The agent may be one or more chemical compounds selected from the group consisting of free radical agents, oxidising agents and enzymes. Alternatively or additionally when the agent brings about degradation or fragmentation of the flocculated structure and/or degradation of the organic polymeric flocculant and/or brings about a reduction in the yield stress of the layer or bed solids the agent may also include radiation. The radiation may be for instance ultrasound, ionising radiation or electromagnetic radiation. When the agent evolves gas it may alternatively be a mechanical apparatus that releases gas bubbles from within the layer of solids, especially where the layer is a sediment or bed.

The agent is preferably selected from the group consisting of free radical agents, oxidising agents and enzymes.

It has been found that the incorporation of a free radical agent or oxidising agent into the flocculation process has resulted in a more rapid compaction phase, and/or reduced viscosity of the layer or bed of solids e.g. sediment at corresponding solids contents such that a higher solids content can be achieved without exceeding the maximum viscosity that the equipment carrying out the removal process can tolerate. In further embodiment enzymes have also been found to provide a similar effect. This is particular the case when the polymer is a natural polymer or semi natural polymer, for instance polysaccharide which may have been modified, and the selected enzyme is known to degrade the natural or semi natural polymer.

Suitable free radical agents include chemical compounds selected from the group consisting off ferrous ammonium sulphate, ceric ammonium nitrate etc.

It may also be desirable to use activators in conjunction with the free radical agents which in some cases may accelerate the radical generation. Typically such activators include amino carboxylates and diamines, cupric EDTA (ethylene diamine tetra acetic acid) and reducing sugars such as fructose and lactose.

Any conventional oxidising agent may be used. Oxidising agents may be chemical substances selected from the group consisting of chlorine, transition metal or other metal compounds in a high oxidation state, such as chromium, manganese, iron and copper compounds each of which include substances that are powerful oxidizing agents, tBHP (tertiary butyl hydro peroxide), sodium sulphite, bi-sulphite compounds, ammonium per sulphate, sodium perborate, sodium hypopchlorite and ozone.

The use of ozone, peracetic, perborates, percarbonate and persulphates have been found to be particularly effective for oxidizing purposes.

Any suitable enzyme capable of acting on the organic polymeric flocculant, particularly as a natural polymer, may be used. Typically such enzymes include hydrolases. Suitable enzymes include proteases, which will break down proteins; glycosylases which break down sugars; pectinases which break down pectin; amylases which degrade starch; esterases which degrade any ester bonds; cellulases which break down cellulose and cellulose compounds; glucosidases and galactosidases or degrading sugars. Other hydrolases may modify the surface of other polymeric flocculants, including for instance polyamides and polyesters. Other enzymes include depolymerases which will break down a polymer, particularly microbiologically generated polymers such as polyesters. Preferred enzymes include amylases, cellulases, galactomannanases. In general these are suitable for use with natural or semi natural polymers for example starch, CMC (carboxy methyl cellulose), guar, alginates, pectinates and sulphated gum carrageenan. Other specific enzymes are known to act on chitosan.

Preferred agents for use in present invention are peroxides. A particular preferred peroxide is hydrogen peroxide.

In the process the agent and the organic polymeric flocculant may be added to the suspension sequentially or simultaneously. Some operations may work better if the agent is added subsequent to the polymeric flocculant. This may be especially so if the agent acts relatively quickly since sufficient time must be allowed to first substantially form the flocculated structure before any substantial effects of the agent occur. Nevertheless, with this order of addition the organic polymeric flocculant should be added to the suspension in a vessel and the agent is applied to the suspension in the same vessel. In this case it is preferred that the agent is added into the layer or bed of solids. Typically this vessel may be a thickener, for instance a gravity thickener used for the sedimentation of suspended solids.

However, in many situations it is preferred that the agent is applied to the suspension prior to or substantially simultaneously with adding the organic polymeric flocculant. Without being limited theory it is thought that adding the agent before any substantial formation of the flocculant structure will ensure that the agent is distributed throughout the flocculated solids. Addition of the agent and the flocculant simultaneously may also provide the advantage of a single addition point especially if the agent and the flocculant are premixed. However, with mixtures of agent and flocculant it may be necessary to ensure that the mixture is applied to the suspension prior to any significant deleterious effects of the agent on the flocculant.

The agent should be applied in an effective amount. Preferably a sufficient quantity should be added in order to ensure that it brings about at least one of:
i) fragmentation of the flocculated structure; and/or
ii) degradation of the organic polymeric flocculant; and/or
iii) brings about a reduction in the yield stress of the layer of solids below the yield stress of a layer of solids at an equivalent solids content that had not been flocculated and without the addition of the agent and/or;

iv) enables an increase in the solids content of at least 5% by weight of the layer having a given yield stress compared to a layer having the same yield stress from an equivalent process but in the absence of the agent.

The amount of agent will vary according to the specific process conditions, the type of substrate and flocculant. The agent preferably should be present in an amount of at least 1 ppm based on weight of agent on volume of the suspension. The agent can be effective at low levels for example between 1 and 10 ppm. Generally the agent will be added in an amount of from at least 100 ppm and in some cases may be at least 1000 ppm based on the weight of the solids in the suspension. In some cases it may be desirable to add significantly higher levels of the agent, for instance as much as 40,000 or 50,000 ppm or higher. Effective doses usually will be in the range between 150 and 20,000 ppm, especially between 1000 and 15,000 ppm.

More preferably the increase in water released from the layer or bed and the increased solids of the layer or bed is also accompanied by a decrease in yield stress. Preferably we find that the yield stress of the layer or bed is less than a layer or bed at equivalent solids content in which the flocculated solids are not exposed to the agent.

It is known that in general solids in suspensions will often settle without the addition of flocculant. The flocculant brings about bridging flocculation of the solids and increases the rate at which the solids settle to form a bed. Thus in conventional gravity thickening situations, improved rate of free settlement and initial compaction are achieved by the use of polymeric flocculants and optionally coagulants. In such a process the individual solid particles tend to gather together to form aggregates which have a more favourable density to surface area ratio. These aggregates can settle to form a compacted bed from which water can be further removed by upward percolation. In this way the bed progressively increases in solids content over an extensive period of time until the desired solids concentration in the bed is reached and material in the bed can be removed.

Unfortunately, in general the viscosity or yield stress of the flocculated settled solids in conventional processes tends to be significantly higher than the settled solids in the absence of the flocculant. This tends to make the removal process of raking and pumping progressively more difficult. On the other hand it would not be practical to concentrate a suspension in the absence of flocculant since this would take an extremely long time, especially in a gravimetric thickener which relies upon free sedimentation.

In the process according to the invention we have found that a more rapid compaction phase can be achieved. In addition it has been found that the present process tends to result in a significantly reduced viscosity or yield stress of the layer of solids or bed as a result of treatment by the agent. In particular we find that the yield stress is not only lower than the equivalent process in the absence of the agent, but the yield stress can be as low as or lower than settled solids in the absence of the flocculant. In some cases we find that the process results in a layer or bed of solids having a yield stress significantly below that of settled solids in the absence of flocculant. This unexpected property of the settled solids facilitates the ease of removal of a solids underflow whilst at the same time ensuring rapid settling of the solids. Furthermore, it is preferred that the process is operated by allowing the solids content of the consolidated bed to increase significantly above that which can be tolerated by the equipment in the absence of the agent. In this sense the consolidated bed may still be operated at the maximum yield stress for the equipment but in which the solids content is significantly higher than the bed in a process without the agent.

The yield stress of the layer of solids including sedimented bed will vary according to the substrate. Typically the maximum yield stress of a sedimented bed that can be tolerated by conventional equipment is usually no more than 250 Pa. Within capabilities of the existing equipment it would not be possible to increase the solids using the conventional process since the yield stress would be too high. The process of the invention employing the agent has been found to reduce the yield stress by at least 10% and usually at least 50% and in some cases as much as 80 or 90% or higher. On the other hand the solids content of the layer or bed produced according to the invention can be allowed to increase by at least 5% and sometimes more than 10% without exceeding the maximum yield stress that can be tolerated by the equipment. In some cases it may be possible to increase the solids by up to 15 or 20% or more in comparison to a layer or bed having the same yield stress obtaining by the equivalent process but in the absence of the agent.

The actual weight percent underflow solids that can be achieved with acceptable yield stress varies considerably dependent upon the constituent and particle size of the suspended solids, and also the age and sophistication of the settling equipment. It may be as low as around 12% (typically Florida phosphate slimes) but is usually between around 20% and 50%.

The Yield Stress is measured by Brookfield R/S SST Rheometer at an ambient laboratory temperature of 25° C. using the RHEO V2.7 software programme in a Controlled Shear Rate mode. Rotation of a Vane spindal (50_25 vane at a 3 to 1 vessel sizing) in 120 equal step increases of 0.025 rpm generate a progressive application of increased Shear Rate.

Yield Stress is defined as the maximum shear stress before the onset of shear. The Yield Stress is calculated by linear regression of the 4 measurement points with Shear Rate >0.1 1/s and subsequent calculation of the intercept of the axis of Tau (Pa) for Shear Rate=0.

The invention is applicable to any solids liquid separation activity in which solids are separated from a suspension. This may include for instance processes involving sedimentation, centrifugation, pressure filtration, belt pressing or belt thickening. The invention is of particular benefit to sedimentation processes. Particularly preferred processes involve subjecting the suspension to flocculation in a gravimetric thickener. In such a process the solids form a compacted layer of concentrated solids, which in general will be significantly higher than in the absence of the agent.

The flocculated solids resulting from the process may form an underflow which may be removed from the flocculation and settling zone. In many instances flocculated solids form an underflow which is then transferred to a disposal area.

As indicated previously the invention is applicable generally to solids liquid separation processes. Thus the suspension may comprise organic material including for instance sewage sludge or cellular material from fermentation processes. The suspension may also be a suspension of cellulosic material, for instance sludges from papermaking processes. Preferably the suspension is an aqueous suspension comprising mineral particles.

In a more preferred aspect of the invention the process involves the treatment of aqueous suspensions resulting from mined mineral processing and other mining wastes, for instance from carbon based industries such as coal and tar sands, comprising suspensions of mineral particles, especially clays. Thus in this preferred aspect of the process the aqueous suspension is derived from mineral or energy processing operations and/or tailings substrates. By energy processing operations we mean preferably processes in which the substrate involves the separation of materials useful as fuels.

A particularly preferred aspect of the process involves suspensions selected from mining and refining operations the group consisting of bauxite, base metals, precious metals, iron, nickel, coal, mineral sands, oil sands, china clay, diamonds and uranium.

Preferably suspended solids in the suspension should be at least 90% by weight greater than 0.5 microns. Frequently the particles in suspension will be at least 90% by weight at least 0.75 microns and preferably at least 90% by weight at least one or two microns. Typically suspended particles may have a particle size at least 90% by weight up to 2 mm and usually at least 90% by weight within the range above 0.5 microns to 2 mm. Preferably suspended particles will be at least 90% by weight up to 1 mm or more preferably at least 90% by weight up to 750 microns, especially at least 90% by weight within the range of between one or two microns and one or two millimeters.

The suspensions will often contain at least 5% by weight suspended solids particles and may contain as much as 30% or higher. Preferably suspensions will contain at least 0.25% more preferably at least 0.5% Usually the suspensions will contain between 1% and 20% by weight suspended solids.

Suitable doses of organic polymeric flocculant range from 5 grams to 10,000 grams per tonne of material solids. Generally the appropriate dose can vary according to the particular material and material solids content. Preferred doses are in the range 10 to 3,000 grams per tonne, especially between 10 and 1000 grams per tonne, while more preferred doses are in the range of from 60 to 200 or 400 grams per tonne.

The aqueous polymer solution may be added in any suitable concentration. It may be desirable to employ a relatively concentrated solution, for instance up to 10% or more based on weight of polymer. Usually though it will be desirable to add the polymer solution at a lower concentration to minimise problems resulting from the high viscosity of the polymer solution and to facilitate distribution of the polymer throughout the suspension. The polymer solution can be added at a relatively dilute concentration, for instance as low as 0.01% by weight of polymer. Typically the polymer solution will normally be used at a concentration between 0.05 and 5% by weight of polymer. Preferably the polymer concentration will be the range 0.1% to 2 or 3%. More preferably the concentration will range from 0.25% to about 1 or 1.5%. Alternatively the organic polymeric flocculant may be added to the suspension in the form of dry particles or instead as a reverse phase emulsion or dispersion. The dry polymer particles would dissolve in the aqueous suspension and the reverse phase emulsion or dispersion should invert directly into the aqueous suspension into which the polymer would then dissolve.

The process according to the invention exhibits improved sedimentation rates. It has been found that sedimentation rate is between 2 and 30 m/hour can be achieved. In addition we find that the process enables greater than 99% by weight of the suspended solids to be removed from a suspension. In addition the process enables an increase in solids sediment concentrations of greater than 10% by weight in comparison to conventional processes operating in the absence of the agent. More preferably reduced sediment yield stress is obtaining compared to the best conventional processes.

The organic polymeric flocculant may include high molecular weight polymers that are cationic, non-ionic, anionic or amphoteric. Typically if the polymer is synthetic it should exhibit an intrinsic viscosity of at least 4 dl/g. Preferably though, the polymer will have significantly higher intrinsic viscosity. For instance the intrinsic viscosity may be as high as 25 or 30 dl/g or higher. Typically the intrinsic viscosity will be at least 7 and usually at least 10 or 12 dl/g and could be as high as 18 or 20 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers are measured using a Number 1 suspended level viscometer at 25° C. in 1M buffered salt solution.

Alternatively, the organic polymeric flocculant may be a natural polymer or semi natural polymer. Typical natural or semi natural polymers include polysaccharides. This will include cationic starch, anionic starch, amphoteric starch, chitosan.

One preferred class of polymers includes for instance polysaccharides such as starch, guar gum or dextran, or a semi-natural polymer such as carboxymethyl cellulose or hydroxyethyl cellulose.

One preferred class of synthetic polymers includes polyethers such as polyalkylene oxides. Typically these are polymers with alkylene oxy repeating units in the polymer backbone. Particularly suitable polyalkylene oxides include polyethylene oxides and polypropylene oxides. Generally these polymers will have a molecular weight of at least 500,000 and often at least one million. The molecular weight of the polyethers may be as high as 15 million of 20 million or higher.

Another preferred class of synthetic polymers include vinyl addition polymers. These polymers are formed from an ethylenically unsaturated water-soluble monomer or blend of monomers.

The water soluble polymer may be cationic, non-ionic, amphoteric, or anionic. The polymers may be formed from any suitable water-soluble monomers. Typically the water soluble monomers have a solubility in water of at least 5 g/100 cc at 25° C. Particularly preferred anionic polymers are formed from monomers selected from ethylenically unsaturated carboxylic acid and sulphonic acid monomers, preferably selected from (meth) acrylic acid, allyl sulphonic acid and 2-acrylamido-2-methyl propane sulphonic acid, and their salts, optionally in combination with non-ionic co-monomers, preferably selected from (meth) acrylamide, hydroxy alkyl esters of (meth) acrylic acid and N-vinyl pyrrolidone. Especially preferred polymers include the homopolymer of sodium acrylate, the homopolymer of acrylamide and the copolymer of sodium acrylate with acrylamide.

Preferred non-ionic polymers are formed from ethylenically unsaturated monomers selected from (meth) acrylamide, hydroxy alkyl esters of (meth) acrylic acid and N-vinyl pyrrolidone.

Preferred cationic polymers are formed from ethylenically unsaturated monomers selected from dimethyl amino ethyl (meth)acrylate-methyl chloride, (DMAEA.MeCl) quat, diallyl dimethyl ammonium chloride (DADMAC), trimethyl amino propyl (meth) acrylamide chloride (ATPAC) optionally in combination with non-ionic co-monomers, preferably selected from (meth) acrylamide, hydroxy alkyl esters of (meth) acrylic acid and N-vinyl pyrrolidone.

In the invention, the polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution.

Optionally a thermal initiator system may be included. Typically a thermal initiator would include any suitable initiator compound that releases radicals at an elevated temperature, for instance azo compounds, such as azo-bis-isobutyronitrile. The temperature during polymerisation should rise to at least 70° C. but preferably below 95° C. Alternatively polymerisation may be effected by irradiation (ultra violet light, microwave energy, heat etc.) optionally also using suitable radiation initiators. Once the polymerisation is complete and the polymer gel has been allowed to cool sufficiently the gel can be processed in a standard way by first comminuting the gel into smaller pieces, drying to the substantially dehydrated polymer followed by grinding to a powder.

Such polymer gels may be prepared by suitable polymerisation techniques as described above, for instance by irradiation. The gels may be chopped to an appropriate size as required and then on application mixed with the material as partially hydrated water soluble polymer particles.

The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

Alternatively the water soluble polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerisation of aqueous monomers in the presence of an aqueous medium containing dissolved low IV polymers such as poly diallyl dimethyl ammonium chloride and optionally other dissolved materials for instance electrolyte and/or multi-hydroxy compounds e.g. polyalkylene glycols, as given in WO-A-9831749 or WO-A-9831748.

The aqueous solution of water-soluble polymer is typically obtained by dissolving the polymer in water or by diluting a more concentrated solution of the polymer. Generally solid particulate polymer, for instance in the form of powder or beads, is dispersed in water and allowed to dissolve with agitation. This may be achieved using conventional make up equipment. Desirably, the polymer solution can be prepared using the Auto Jet Wet (trademark) supplied by Ciba Specialty Chemicals. Alternatively, the polymer may be supplied in the form of a reverse phase emulsion or dispersion which can then be inverted into water.

The following examples indicate ways in which the invention can be employed without in any way intending to be limiting.

EXAMPLES

Flocculants Employed
Description of Polymers Used
Polymer A—a sodium polyacrylate of approx 15,000,000 molecular weight
Polymer B—an acrylamide homopolymer of approx 15,000,000 molecular weight Polymer C—a sodium salt of acrylamido methyl propane sulphonic acid/acrylamide copolymer of approx. 15,000,000 molecular weight.
Polymer D—sodium acrylate/acrylamide 10/90 copolymer of approx 15,000,000 molecular weight.
Polymer E—sodium acrylate/acrylamide 30/70 copolymer of approx 15,000,000 molecular weight.
Polymer F—sodium acrylate/acrylamide 50/50 copolymer of approx 20,000,000 molecular weight.
Polymer G—sodium acrylate/acrylamide 30/70 copolymer of approx 17,000,000 molecular weight.
Polymer H—methyl chloride quaternised dimethylaminoethylacrylate/acrylamide 60/40 copolymer of approx 12,000,000 molecular weight.

Example 1

Evaluation of Hydrogen Peroxide Effect on China Clay Slurry
Laboratory Experimental Procedure Two replicate china clay slurries, (50% w/w), were employed to assess the effect of hydrogen peroxide on equivalent non-flocculated china clay slurries. The first slurry (control sample) were treated with water (1.5 cm$^3$). The second slurry was treated with Hydrogen Peroxide (30%) at a dose equivalent to 1500 ppm (ie 1.5 cm$^3$). These additions were mixed by hand using a spatula and left for a period of 30 minutes to stabilise. At this juncture, the yield stress of the slurry was measured using a Brookfield soft solids tester (Medium Vane). A number of Yield Stress readings were taken over time.

The Yield Stress is measured by Brookfield R/S SST Rheometer at an ambient laboratory temperature of 25° C. using the RHEO V2.7 software programme in a Controlled Shear Rate mode. Rotation of a Vane spindal (50__25 vane at a 3 to 1 vessel sizing) in 120 equal step increases of 0.025 rpm generate a progressive application of increased Shear Rate.

Yield Stress is defined as the maximum shear stress before the onset of shear.

The Yield Stress is calculated by linear regression of the 4 measurement points with Shear Rate >0.1 1/s and subsequent calculation of the intercept of the axis of Tau (Pa) for Shear Rate=0.

The above work was conducted to confirm whether hydrogen peroxide had any interaction with the unflocculated slurry. The principle requisite is to prove that any deviation from the control could be attributable to flocculant interactions alone.

Prior to treatment the yield stress of the control sample was 334 Pa whilst the sample awaiting hydrogen peroxide treatment had a yield stress of 319 Pa. Treatment with water and hydrogen peroxide led to an immediate decline in yield stress with the control at 290 Pa and the hydrogen peroxide treated test registering 284 Pa.

After 89 hours the yield stress of the control sample was 244 Pa whilst the hydrogen peroxide system was 203 Pa.

At this juncture, the hydrogen peroxide dose was increased to 15,000 ppm to reflect the higher dose used in the combined underflow evaluations that follow, whilst the control was again subject to an equivalent volume of water to negate dilution effects. The yield stress of the control dropped to 185 Pa whilst the treated system fell to 162 Pa.

After 239 cumulative hours, or 148 hours beyond the dose increase, final yield stress measurement for the control was 352 Pa whilst the hydrogen peroxide treated system provided a yield stress of 377 Pa.

These results are not deemed to be significantly different and imply that there is no interaction between the china clay slurry and the hydrogen peroxide.

Example 2

The influence of hydrogen peroxide on the compacted volume and settled bed rheology for a flocculated clay suspension Laboratory Experimental Procedure China clay slurries (6% w/v, 2 g/l salted) were made up in bulk. Solutions of the chosen flocculant were applied as a 0.05% w/w solution diluted from a 0.5% w/w original stock solution. Flocculation tests were conducted in 500 ml measuring cylinders employing a plunger method of agitation. Initial tests were employed to establish a flocculant dose profile and identify the required dose necessary for attainment of a settlement rate of 10 to 15 cm/min. Upon identifying an appropriate dose, a number of repeat tests (dependent upon the required number of underflows) were carried out. The treated slurries were left to settle to a desired level, designated at the onset of testwork.

The supernatant liquor was siphoned of to the designated level in each cylinder required. A control test was progressed by combining a set number of underflows in a 1000 ml cylinder with removable base, in the absence of any additional treatment. The remaining tests required the same number of combined underflows, however before each underflow was transferred to a 1000 ml cylinder, it was treated with an appropriate split dose (ie total dose split between the number of underflows to be combined) of hydrogen peroxide. Upon combining the appropriate number of underflows, the cylinder was topped up to 1000 cm$^3$ with the siphoned supernatant liquor, removed earlier.

At this juncture rakes were placed in each cylinder, attached to motors (6 rph) and aligned to ensure they were level and not obstructed by the cylinder walls to ensure consistent raking. Upon commencement of motor activation/raking, the underflow volume was recorded at intervals, until the combined underflow had settled to a desired level or was fully compacted to its lowest attainable level. Upon completion the supernatant liquor was siphoned of to ~300 cm$^3$ and the rakes were gently removed. The base was then removed to provide an undisturbed sample of the settled bed. The yield stress of the compacted underflow was measured using a Brookfield soft solids tester (Medium Vane) and upon completion of the rheology measurement the underflow was characterised in terms of solids content (% w/v and % w/w), by drying a weighed portion.

TABLE 1

Effect of flocculant and $H_2O_2$ on the underflow Yield Stress
Yield Stress (Pa) versus Solids Content (% w/v)

| Solids Content, % w/V | Baseline | Polymer A | Polymer A with $H_2O_2$ | Polymer B | Polymer B with $H_2O_2$ |
|---|---|---|---|---|---|
| 20.4 | 11 | | | | |
| 22.2 | 14 | | | | |
| 24.7 | 19 | | | | |
| 26.1 | 22 | | | | |
| 27.5 | 27 | | | | |
| 29.3 | 34 | | | | |
| 30.7 | 38 | | | | |
| 31.4 | | | 20 | | |
| 31.9 | | 38 | | | |
| 32 | | | 21 | | |
| 33 | 48 | | | | |

TABLE 1-continued

Effect of flocculant and $H_2O_2$ on the underflow Yield Stress
Yield Stress (Pa) versus Solids Content (% w/v)

| Solids Content, % w/V | Baseline | Polymer A | Polymer A with $H_2O_2$ | Polymer B | Polymer B with $H_2O_2$ |
|---|---|---|---|---|---|
| 33.3 | 53 | | | | |
| 34 | | | 54 | | |
| 34.7 | 62 | | | | |
| 35.7 | | | 80 | | |
| 37.4 | | 103 | | | |
| 39.2 | | 123 | | | |
| 39.9 | | | 162 | | |
| 41 | | | | 18 | |
| 41.1 | | | | 10 | |
| 41.6 | | 158 | | | |
| 42.9 | | 184 | | | |
| 49.1 | | | 701 | | |
| 50.1 | | | | | 54 |
| 50.8 | | | | 584 | |

Results for Polymers A and B are plotted in a graph shown in FIG. 1.

The graph shows that the use of high molecular weight flocculants tends to impart an increase in settled bed Yield Stress beyond that given by the untreated substrate. The introduction of hydrogen peroxide to the flocculation process has resulted in a reduction in Yield stresses, at equivalent solids concentrations, to levels significantly lower than those given by untreated material.

Example 1 showed that Hydrogen Peroxide does not independently reduce the Yield Stress of the china clay slurry, therefore, any differences in a flocculated system can be attributed to the synergistic interaction between flocculant and Hydrogen Peroxide.

Results infer that increased solids content has a reduced impact on increasing yield stress compared to the untreated control, when the flocculant present in the underflow, irrespective of ionic content, has undergone treatment via hydrogen peroxide.

Laboratory Experimental Procedure for the Following Examples 3-9

Initial flocculation, combined underflow/chemical treatment and raking tests followed the methods outlined in the laboratory experimental procedure in Example 3

Effect of hydrogen peroxide dose on settled bed compaction and rheology

TABLE 2

Influence of Hydrogen Peroxide on settled bed characteristics of Polymer A flocculation for 6% w/v (2 g/l salted) China Clay

| Settled Bed Characteristics | Control (0 ppm Hydrogen Peroxide) | Hydrogen Peroxide, ppm | | |
|---|---|---|---|---|
| | | 15,000 | 1500 | 150 |
| Solids, % w/w | 36.5 | 40.0 | 40.5 | 43.0 |
| Solids, % w/v | 49.1 | 52.4 | 54.1 | 59.5 |
| Yield Stress, Pa | 701.0 | 24.0 | 42.0 | 91.0 |

A decrease in hydrogen peroxide dose appears to promote increased solids contents with hydrogen peroxide providing 52.4, 54.1 and 59.5% w/v solids at 15,000, 1500 and 150 ppm respectively. The lowest hydrogen peroxide dose (150 ppm)

equates to an increase in underflow solids content of 21% when compared directly to the control.

The yield stress measurement of the control is 701 Pa. Treatment with 15,000 ppm hydrogen peroxide reduces the measured yield stress by approximately 96% to 24 Pa. 1500 and 150 ppm hydrogen peroxide reduces the yield stress to 42 Pa (94% reduction) and 91 Pa (87% reduction) respectively. These results infer that yield stress is reduced even at increased solids contents when Polymer A flocculant present in the underflow has undergone treatment via hydrogen peroxide.

Example 4

TABLE 3

Influence of Hydrogen Peroxide on settled bed characteristics of Polymer B flocculation for 6% w/v (2 g/l salted) China Clay

| Settled Bed Characteristics | Control (0 ppm Hydrogen Peroxide) | Hydrogen Peroxide, ppm | | |
|---|---|---|---|---|
| | | 15,000 | 1500 | 150 |
| Solids, % w/w | 42.6 | 42.2 | 43.0 | 43.1 |
| Solids, % w/v | 57.3 | 58.3 | 62.8 | 64.9 |
| Yield Stress, Pa | 790.0 | 86.0 | 137.0 | 312.0 |

Hydrogen peroxide provides 58.3, 62.8 and 64.9% w/v solids at 15,000, 1500 and 150 ppm respectively. The lowest hydrogen peroxide dose (150 ppm) equates to an increase in underflow solids content of 13% when compared directly to the control.

The yield stress measurement of the control is 790 Pa. Treatment with 15,000 ppm hydrogen peroxide reduces the measured yield stress by approximately 89% to 86 Pa. 1500 and 150 ppm hydrogen peroxide reduces the yield stress to 137 Pa (83% reduction) and 312 Pa (60% reduction) respectively.

These results infer that yield stress is reduced even at increased solids contents when Polymer B flocculant present in the underflow has undergone treatment via hydrogen peroxide.

Example 5

TABLE 4

Influence of Hydrogen Peroxide on settled bed characteristics of Polymer C flocculation for 6% w/v (2 g/l salted) China Clay

| Settled Bed Characteristics | Control (0 ppm Hydrogen Peroxide) | Hydrogen Peroxide, ppm | | |
|---|---|---|---|---|
| | | 15,000 | 1500 | 150 |
| Solids, % w/w | 41.1 | 44.1 | 43.1 | 42.6 |
| Solids, % w/v | 57.1 | 62.0 | 59.8 | 63.3 |
| Yield Stress, Pa | 761.0 | 157.0 | 142.0 | 209.0 |

Hydrogen peroxide provides 62.0, 59.8 and 63.3% w/v solids at 15,000, 1500 and 150 ppm respectively. The lowest hydrogen peroxide dose (150 ppm) equates to an increase in underflow solids content of 11% when compared directly to the control.

The yield stress measurement of the control is 761 Pa. Treatment with 15,000 ppm hydrogen peroxide reduces the measured yield stress by approximately 79% to 157 Pa. 1500 and 150 ppm hydrogen peroxide reduces the yield stress to 142 Pa (81% reduction) and 209 Pa (72% reduction) respectively. These results infer that successful improvement over the control is possible through the use of hydrogen peroxide with Polymer C. As the dose is reduced there is an increase in the underlying yield stress, however the results still remain well below that of the control even at higher solids contents.

Example 6

TABLE 5

Influence of Hydrogen Peroxide on settled bed characteristics of Polymer D flocculation for 6% w/v (2 g/l salted) China Clay

| Settled Bed Characteristics | Control (0 ppm Hydrogen Peroxide) | Hydrogen Peroxide, ppm | | | |
|---|---|---|---|---|---|
| | | 15,000 | 1500 | 150 | 15 |
| Solids, % w/w | 40.1 | 40.2 | 41.7 | 41.7 | 42.3 |
| Solids, % w/v | 51.9 | 54.9 | 56.4 | 56.7 | 64.4 |
| Yield Stress, Pa | 804 | 66 | 87 | 91 | 219 |

Hydrogen peroxide provides 54.9, 56.4, 56.7 and 64.4% w/v solids at 15,000, 1500, 150 and 15 ppm respectively. The lowest hydrogen peroxide dose (15 ppm) equates to an increase in underflow solids content of 24% when compared directly to the control.

The yield stress measurement of the control is 804 Pa. Treatment with 15,000 ppm hydrogen peroxide reduces the measured yield stress by approximately 92% to 66 Pa. 1500, 150 and 15 ppm hydrogen peroxide reduces the yield stress to 87 Pa (89% reduction), 91 Pa (88% reduction) and 219 Pa (73% reduction) respectively.

These results infer that yield stress is reduced even at increased solids content when the Polymer D flocculant present in the underflow has undergone treatment via hydrogen peroxide, even at the lowest dose employed (15 ppm).

Example 7

TABLE 6

Influence of Hydrogen Peroxide on settled bed characteristics of Polymer D flocculation for a 4.6% w/v coal tailings slurry

| Settled Bed Characteristics | Control (0 ppm Hydrogen Peroxide) | Hydrogen Peroxide, ppm | | |
|---|---|---|---|---|
| | | 15,000 | 1500 | 150 |
| Solids, % w/w | 49.8 | 49.7 | 50.8 | 50.9 |
| Solids, % w/v | 67.2 | 67.3 | 71.8 | 72.3 |
| Yield Stress, Pa | 1139.0 | 13.0 | 243.0 | 221.0 |

Hydrogen peroxide provides 67.3, 71.8 and 72.3% w/v solids at 15,000, 1500 and 150 ppm respectively. The lowest hydrogen peroxide dose (150 ppm) equates to an increase in underflow solids content of 8% when compared directly to the control, and the 1500 ppm dose gives a 7% increase. At the highest hydrogen peroxide dose (15,000 ppm), the underflow solids were equivalent to the control.

The yield stress measurement of the control is 1139 Pa. Treatment with 15,000 ppm hydrogen peroxide reduces the measured yield stress by approximately 99% to 13 Pa for an underflow with similar solids content. 1500 and 150 ppm hydrogen peroxide reduces the yield stress to 243 Pa (78% reduction) and 221 Pa (80% reduction) respectively.

These results infer that successful improvement over the control is possible through the use of hydrogen peroxide with Polymer D on coal tailings. As the dose is reduced there is an increase in the underlying yield stress, however the results still remain well below that of the control.

Example 8

TABLE 7

Influence of Hydrogen Peroxide on settled bed characteristics of Polymer E flocculation for 6% w/v (2 g/l salted) China Clay

| Settled Bed Characteristics | Control (0 ppm Hydrogen Peroxide) | Hydrogen Peroxide, ppm | | | | | |
|---|---|---|---|---|---|---|---|
| | | 15,000 | 1500 | 150 | 15 | 1.5 | 0.15 |
| Solids, % w/w | 36.7 | 40.6 | 39.8 | 39.2 | 41.5 | 39.0 | 39.7 |
| Solids, % w/v | 51.2 | 55.4 | 55.2 | 53.3 | 58.6 | 53.5 | 55.4 |
| Yield Stress, Pa | 540 | 78 | 76 | 65 | 116 | 117 | 353 |

Hydrogen peroxide provides 55.4, 55.2, 53.3, 58.6, 53.5 and 55.4% w/v solids at 15,000, 1500, 150, 15, 1.5 and 0.15 ppm respectively. The hydrogen peroxide dose of 15 ppm equates to an increase in underflow solids content of 14% when compared directly to the control.

The yield stress measurement of the control is 540 Pa. Treatment with 15,000 ppm hydrogen peroxide reduces the measured yield stress by approximately 86% to 78 Pa. 1500, 150, 15, 1.5 and 0.15 ppm hydrogen peroxide reduces the yield stress to 76 Pa (86% reduction), 65 Pa (88% reduction), 116 Pa (78% reduction), 117 Pa (78% reduction) and 353 Pa (35% reduction) respectively.

These results infer that yield stress is not increased by increased solids content when the Polymer D flocculant present in the underflow has undergone treatment via hydrogen peroxide treatment, even at a low dose of 1.5 ppm.

Example 9

TABLE 8

Influence of Hydrogen Peroxide on settled bed characteristics of Polymer E flocculation for a 4.6% w/v Sand and Gravel washing tailings slurry

| Settled Bed Characteristics | Control (0 ppm Hydrogen Peroxide) | Hydrogen Peroxide, ppm | | | | |
|---|---|---|---|---|---|---|
| | | 15,000 | 1500 | 150 | 15 | 1.5 |
| Solids, % w/w | 35.9 | 30.0 | 36.5 | 37.6 | 34.5 | 37.3 |
| Solids, % w/v | 46.8 | 37.1 | 50.1 | 51.5 | 44.4 | 49.2 |
| Yield Stress, Pa | 1187 | 51 | 337 | 877 | 867 | 1100 |

Hydrogen peroxide provides 37.1, 50.1, 51.5, 44.4 and 49.2% w/v solids at 15,000, 1500, 150, 15 and 1.5 ppm respectively. At 15,000 and 15 ppm this equates to a decrease in underflow solids content of 21 and 5% respectively when compared directly to the control. The solids content achieved at 150 ppm equates to an increase 10% when compared directly to the control. The yield stress measurement of the control is 1187 Pa. Treatment with 15,000 ppm hydrogen peroxide reduces the measured yield stress by approximately 95.7% to 51 Pa although this is at reduced solids content. 1500 ppm hydrogen peroxide reduces the yield stress to 337 Pa (72% reduction), which is a significant decrease, and at a higher solids content. 150, 15 and 1.5 ppm hydrogen peroxide reduces the yield stress to 877 Pa (26% reduction), 867 Pa (27% reduction) and 1100 Pa (7% reduction) respectively. These results infer that successful increases in compacted solids content in combination with reductions in Yield Stress compared with the Control are achieved with treatment of Polymer E through its combined use with hydrogen peroxide.

Example 10

Influence of oxidising and other reagents on flocculated 4% w/v (2 g/l salted) china clay.

In order to test a wide variety of reagents a screening test was devised as follows:—

1. 675 ml of 4% w/v (2 g/l salted) china clay was placed in a 1000 ml tall form beaker. The contents were stirred at 400 rpm using a mechanical gate stirrer. 225 ml of a dilute solution (approximately 0.002% in deionised water) of Polymer E was added and stirring continued for 4 minutes. Stirring speed was reduced to 200 rpm for a further 2 minutes. Stirring was then ceased and the time taken for the mudline to settle between the 750 ml and the 550 ml marks was recorded. Settlement rate in cm/min was calculated from this figure.
2. The dose of Polymer E required to achieve a settlement rate of around 10 cm/min was established from these tests by evaluating a range of solution concentrations. Once this dose had been established the same dose was used for all subsequent tests.
3. The procedure as described under 1 was repeated whereby the dilute solution of Polymer E was prepared in deionised water as a control. Once the initial settlement rate had been measured the sample was left undisturbed for a period of time, it was then stirred at 200 rpm for 2 minutes and the settlement time re-measured. This was repeated several times over a period of several hours.
4. To evaluate the different reagents, these were added to the polymer solution prior to addition to the china clay in an amount that resulted in a dose of 1000 ppm in the final slurry.

In the results in Table 9 the settlement rate after a total of 18 hours of time had elapsed is quoted. Within this period of time each sample had been stirred and allowed to settle a total of 3 times Dose of Polymer E used in all tests was 4.0 mg/l. The settlement rate at time zero for the control was 9.8 cm/min.

TABLE 9

| Reagent | Settlement Rate at 18 hours (cm/min) |
|---|---|
| Control | 7.8 |
| Hydrogen Peroxide | 0.6 |
| Sodium Perborate | 3.8 |
| Sodium Hyperchlorite | 0.6 |
| Sodium Persulphate | 6.1 |
| Sodium Metabisulphite | 4.0 |
| Sodium Bisulphite | 3.3 |
| Ammonium Persulphate | 1.8 |
| Sodium Nitrite | 8.1 |

TABLE 9-continued

| Reagent | Settlement Rate at 18 hours (cm/min) |
|---|---|
| Sodium Nitrate | 8.1 |

Reagents that resulted in a significantly lower settlement rate than the control indicate that degradation of the flocculant or floc structure has taken place to a greater degree than through simple mechanical stirring. In the above table all reagents that are know as oxidising agents/free radical sources showed degradation of the floc to a greater or lesser degree.

Example 11

Table 10 Influence of oxidizing reagents on flocculated 4% w/v (adjusted ph 2 using sulphuric acid) china clay.

This substrate is intended to be representative of substrates encountered in hydrometallurgical processes involving acid leaching e.g. copper, electrolytic zinc etc.

The test procedure as described under example 10 was used, but using Polymer B and 4% w/w china clay adjusted to pH 2 as substrate.

In the results below the settlement rate after a total of 21 hours of time had elapsed is quoted. Within this period of time each sample had been stirred and allowed to settle a total of 4 times.

Dose of Polymer B used in all tests was 18 mg/l. The settlement rate at time zero for the control was 9.3 cm/min.

In this series of tests a range of dose levels of the reagents was added as indicated in the table below.

| Reagent | Dose (ppm) | Settlement Rate at 21 hours elapsed time |
|---|---|---|
| Control | — | 9.3 |
| Hydrogen Peroxide | 100 | 0.7 |
|  | 350 | 0.6 |
|  | 600 | 0.5 |
|  | 1000 | 0.5 |
| Sodium Perborate | 100 | 0.6 |
|  | 350 | 0.7 |
|  | 600 | 0.6 |
|  | 1000 | 0.6 |
| Sodium Hypochlorite | 100 | 3.1 |
|  | 350 | 6.9 |
|  | 600 | 3.1 |
|  | 1000 | 3.2 |

All 3 reagents showed degradation of the flocs over the time period investigated.

Example 12

Table 11 Influence of hydrogen peroxide on flocculated 4% w/v (containing 33.3g/l sodium hydroxide) china clay.

This substrate is intended to be representative of substrates encountered in hydrometallurgical processes involving alkali leaching e.g. alumina, or other alkaline systems.

The test procedure as described under example 11 was used, but using Polymer F and 4% w/w china clay containing 33.3 g/l sodium hydroxide as test substrate.

In the results below the settlement rate after a total of 21 hours of time and 66 or had elapsed is quoted. Within this period of time each sample had been stirred and allowed to settle a total of 3 times at 21 hours and 5× at 66 hours. Dose of Polymer F used in all tests was 3.3 mg/l. The settlement rate at time zero for the control was 9.3 cm/min.

| Dose of Hydrogen Peroxide | Settlement Rate at 21 hours elapsed time | Settlement Rate at 66 hours elapsed time |
|---|---|---|
| Control | 10.2 | 6.9 |
| 100 | 7.6 | 8.1 |
| 350 | 11.3 | 14.6 |
| 600 | 11.2 | 10.9 |
| 1000 | 8.8 | 9.4 |

Under these conditions hydrogen peroxide is ineffective indicating that it will be necessary to have a range of reagents for differing circumstances.

Example 13

Table 12 Influence of Sodium Hypochlorite and Sodium Perborate on flocculated 4% w/v (containing 33.3g/l sodium hydroxide) china clay.

The test procedure as described under example 13 was used, but using Polymer F and 4% w/w china clay containing 33.3 g/l sodium hydroxide as test substrate.

In the results below the settlement rate after a total of 26 hours of time and 90 hours of time had elapsed is quoted. Within this period of time each sample had been stirred and allowed to settle a total of 3 times at 26 hours and 4× at 90 hours.

Dose of Polymer F used in all tests was 3.3 mg/l. The settlement rate at time zero for the control was 9.6 cm/min.

| Reagent | Dose of Reagent | Settlement Rate at 21 hours elapsed time | Settlement Rate at 66 hours elapsed time |
|---|---|---|---|
|  | Control | 10.2 | 7.7 |
| Sodium Hypochlorite | 100 | 8.9 | 5.2 |
|  | 350 | 9.6 | 4.4 |
|  | 600 | 7.3 | No result taken |
|  | 1000 | 4.3 | 1.5 |
| Sodium Perborate | 100 | 15 | 5.5 |
|  | 350 | 6.3 | 5.5 |
|  | 600 | 12.7 | 5.3 |
|  | 1000 | 11.7 | 4.2 |

Both these reagents achieved degradation over a long period of time.

Example 14

Table 13 The influence of Hydrogen Peroxide on tailings from a granite quarrying operation The test procedure as described under example 13 was used, but using Polymer G and tailings from a granite quarrying operations at 3% w/v solids was used as test substrate.

In the results below the settlement rate after a total of 20 hours of time had elapsed is quoted. Within this period of time each sample had been stirred and allowed to settle a total of 6 times.

Dose of Polymer G used in all tests was 1.5 mg/l. The settlement rate at time zero for the control was 8.2 cm/min.

| Dose of Hydrogen Peroxide (ppm) | Settlement Rate at 20 hours elapsed time |
|---|---|
| Control | 6.4 |
| 1 | 6.9 |
| 5 | 5.2 |
| 10 | 3.9 |
| 100 | 3.0 |
| 500 | 0.8 |

These results showed that hydrogen peroxide does cause degradation of the flocs formed in this effluent but at least 5 ppm is required to have any effect and the best results are obtained at >100 ppm.

Example 15

Table 14 The of Hydrogen Peroxide on settled bed characteristics of Polymer G flocculation of tailings from a granite quarrying operation The laboratory procedure followed was as described in example 2 with the exception that tailings from a granite quarrying operation at 3% solids was used in place of the china clay slurry and Polymer G was used to flocculate the sample at a dose level of 1.5 mg/l.

| Settled Bed Characteristics | Control (0 ppm Hydrogen Peroxide) | Hydrogen Peroxide (ppm) | | |
|---|---|---|---|---|
| | | 10 | 100 | 500 |
| Solids Content % (w/w) | 46.9 | 44.3 | 46.6 | 47.4 |
| Yield Stress (Pa) | 99 | 10 | 29 | 4 |

These results show that the yield stress in the underflow is significantly lower than that of the control sample at similar solids content. It also confirms that the tests described in example 14 provides a good indication of the reagents that will beneficially affect underflow characteristics.

Example 16

Table 15 The influence of Hydrogen Peroxide on settled bed characteristics of Polymer D, Carboxymethyl cellulose (CMC) and blends of Polymer D and CMC flocculation of 6% w/v (2g/l salted) china clay.

The laboratory procedure was as described in example 2. Due to differing flocculation abilities of CMC and Polymer D, different dose levels of the individual polymers and the blends were required to achieve the appropriate level of flocculation.

| Settled Bed Characteristics | Control (0 ppm Hydrogen Peroxide) | Hydrogen Peroxide (ppm) | | | |
|---|---|---|---|---|---|
| | | 15 | 150 | 1500 | 15000 |
| Flocculated using 11.5 mg/l Polymer D | | | | | |
| Solids Content % (w/w) | 40.1 | 42.3 | 41.7 | 41.7 | 40.2 |
| Yield Stress (Pa) | 804 | 219 | 91 | 87 | 66 |
| Flocculated using 50 mg/l CMC | | | | | |
| Solids Content % (w/w) | 38.7 | 38.3 | 37.7 | 36.5 | 36.4 |
| Yield Stress (Pa) | 718 | 187 | 19 | 11 | 17 |
| Flocculated using 20 mg/l 80:20 Polymer D:CMC | | | | | |
| Solids Content % (w/w) | 38.7 | 39.0 | 39.8 | 39.9 | 38.6 |
| Yield Stress (Pa) | 510 | 179 | 163 | 113 | 62 |

These results show that modest increases in underflow solids content are obtained by the addition of hydrogen peroxide when flocculation was achieved using Polymer D and blends of Polymer D and CMC. No increase in underflow solids is observed when flocculation was achieved using CMC alone. However, for all flocculation treatments the addition of hydrogen peroxide provides significant reductions in yield stress, of between 72% and 97%.

Example 17

Table 16 The influence of hydrogen peroxide on 4% (2g/l salted) china clay flocculated with a cationic flocculant —Polymer H. Tests were carried out as described in Example 10, except that Polymer H was used as flocculant, the dose to achieve around 5 cm/min was established at 8.8 mg/l, the final settlement rate was measured after 27 hours had elapsed and each sample had been stirred and allowed to settle a total of 8 times in this period.

The settlement rate at time zero for the control was 4.4 cm/min.

| Reagent | Settlement Rate at 27 hours (cm/min) |
|---|---|
| Control | 5.8 |
| Hydrogen Peroxide | 2.1 |
| Sodium Perborate | <1 |
| Sodium Hyperchlorite | <1 |

Example 18

Table 17 The influence of Ozone water on 4% (2g/l salted) china clay flocculated with Polymer D Tests were carried out as follows. 800 mls of a 4% (2 g/l salted) china clay slurry was placed in a 1000 ml cylinder. The slurry was stirred meachanically using a paddle stirrer rotating at 900 rpm. 20 mls of a 0.05% solution of polymer D was added to the substrate and stirred for 50 seconds. The resultant free settlement rate of the solids mud-line was measured.*[1] Once the solids had settled to below the 250 ml mark the contents of the cylinder were stirred for 15 seconds and the free settlement rate again measured. This was repeated as many times as required. When ozone was used, the test was repeated to point *1. Then ozone was bubbled into the sample at a rate of 3 l/minute for 15 minutes. The ozone generator was switched off and the whole sample was stirred at 900 rpm for 15 seconds and the settlement rate was re measured.

| Test | Comments on Treatment | Settlement Rate hours (cm/min) |
|---|---|---|
| Control no flocculant | | 0.14 |
| Control - 20 mls of 0.05% polymer D | Initial measurement | 13.9 |
| | Re-stirred 1 | 9.1 |
| | Re-stirred 2 | 6.9 |
| | Re-stirred 3 | 5.6 |
| | Re-stirred 4 | 4.9 |
| | Re-stirred 5 | 4.4 |
| 20 mls 0.05% polymer D | Initial measurement | 9.7 |
| | Following ozone treatment | 0.41 |

These results show that the addition of ozone negates the effect of flocculation to such a degree that the settlement rate is close to that of the unflocculated china clay. Mechanical degradation by stirring does not approach this effect.

Example 19

The influence of hydrogen peroxide on the molecular weight of Polymer E in solution
Procedure 27.82 g of 100 volumes (30% w/v) hydrogen peroxide were weighed into a 250 ml volumetric flask to produce a 3.338% solution. A double strength, size exclusion chromatography (SEC), mobile phase was also prepared, 11.68 g $NaCl+2.28$ g $K_2HPO_4$ in a 500 ml volumetric flask. An approximately 0.5% solution of Polymer E was prepared in deionised water and tumbled overnight. The dry weight was measured in an oven set at 110 C.

A portion of the polymer solution was weighed into a 100 ml volumetric flask. 50 ml of buffer was added (double strength SEC mobile phase) and the solution was diluted to the mark with the hydrogen peroxide solution. A control sample was prepared in a similar manner but de-ionised water was substituted for the peroxide solution.

One point specific viscosity measurements were made using a Schott 531 10 Ubbelohde capillary viscometer in an AVS 350 automatic viscosity measuring unit.

| Polymer E with Hydrogen Peroxide | | Polymer E Control |
|---|---|---|
| time from start/mins | 1 pt sp visc dl/g | 1 pt sp visc dl/g |
| 12 | 23.09 | |
| 35 | | 22.78 |
| 66 | 23.02 | |
| 129 | 22.92 | |
| 152 | | 22.74 |
| 215 | 22.77 | |
| 267 | | 22.65 |
| 399 | 22.43 | |
| 412 | | 22.50 |
| 1356 | 21.83 | |
| 1385 | 20.58 | |
| 4394 | | 22.32 |
| 5786 | 14.63 | |

This indicates that hydrogen peroxide does bring about degradation of Polymer E molecular weight.

The invention claimed is:

1. A process of concentrating an aqueous suspension of solid particles comprising mineral particles, the process comprising the steps of:
(i) adding at least one organic polymeric flocculant to the suspension thereby, wherein said organic polymeric flocculant is a nonionic or anionic polymer having an intrinsic viscosity of at least 4 dl/g,
(ii) forming flocculated solids, and
(iii) allowing the flocculated solids to settle forming a layer of solids and a more concentrated suspension,
wherein an effective amount of an agent is applied to the suspension prior to or substantially simultaneously with adding the organic polymeric flocculant and/or the organic polymeric flocculant is added to the suspension in a vessel and the agent is applied to the suspension in the same vessel,
wherein the agent is a free radical agent, and
wherein the free radical agent brings about a reduction in yield stress of the layer of solids at least 10% below the yield stress of a layer of solids at an equivalent solids content without the addition of the free radical agent, and an increase in aqueous liquid released from said layer,
wherein the free radical agent is tertiary butyl hydro peroxide, sodium sulphite, sodium bisulphite, sodium persulphate, sodium perborate, sodium nitrite, or sodium percarbonate.

2. A process according to claim 1 in which the settled layer of flocculated solids and the more concentrated suspension of step (iii) form a flocculated structure and wherein the free radical agent brings about fragmentation of the flocculated structure.

3. A process according to claim 1 in which the free radical agent brings about degradation of the organic polymeric flocculant.

4. A process according to claim 1 in which the free radical agent brings about a reduction in the yield stress of the layer of solids at least 30% below the yield stress of a layer of solids at an equivalent solids content without the addition of the free radical agent.

5. A process according to claim 1 in which the addition of the free radical agent brings about an increase in the solids content of at least 5% by weight of the layer having a given yield stress compared to a layer having the same yield stress from an equivalent process but in the absence of the free radical agent.

6. A process according to claim 1 in which the free radical agent evolves a gas.

7. A process according to claim 1 in which the flocculated solids settle to form a bed and water is released from the suspension and in which treatment of the bed of solids by the free radical agent brings about an increase in the solids content of the bed by comparison to the equivalent process carried out in the absence of the free radical agent.

8. A process according to claim 1 in which the flocculated solids settle to form a bed of solids and water is released from the suspension and in which the free radical agent is in contact with the bed and said free radical agent evolves gas bubbles which cause the formation of channels in said bed and facilitate the release of water from the suspension.

9. A process according to claim 1 in which the suspension is subjected to flocculation in a gravimetric thickener or disposal area and the flocculated solids are allowed to settle by sedimentation and form a compacted layer of more concentrated solids.

10. A process according to claim 1 in which the layer of solids forms an underflow, which is then transferred to a disposal area.

11. A process according to claim 1 in which the aqueous suspension is derived from mineral or energy processing operations and/or tailings substrates and is selected from the group consisting of bauxite, base metals, precious metals, iron, nickel, coal, mineral sands, oil sands, china clay, diamonds and uranium.

12. A process according to claim 1 in which the organic polymeric flocculant is selected from the group consisting of the homopolymer of sodium acrylate, the homopolymer of acrylamide and the copolymer of acrylamide and sodium acrylate.

13. The process according to claim 1, wherein the dose of organic polymeric flocculant is in the range of from 5 grams to 10,000 grams per tonne of material solids.

14. The process according to claim 1, wherein the dose of organic polymeric flocculant is in the range of from 60 grams to 400 grams per tonne of material solids.

15. The process according to claim 1, wherein the free radical agent is added in amount of between 150 and 20,000 ppm.

16. The process according to claim 1, wherein the free radical agent is added in amount of between 1000 and 15,000 ppm.

17. The process according to claim 1, wherein said organic polymeric flocculant is formed from (meth)acrylic or (meth)acrylamide monomers.

* * * * *